US009879844B2

(12) United States Patent
Taylor

(10) Patent No.: US 9,879,844 B2
(45) Date of Patent: Jan. 30, 2018

(54) SUPPORT STRUCTURE FOR HORIZONTALLY EXTENDING LAMP

(71) Applicant: TADD, LLC, Cary, IL (US)

(72) Inventor: Timothy Taylor, Barrington, IL (US)

(73) Assignee: TADD, LLC, Cary, IL (US)

(*) Notice: Subject to any disclaimer, the term of this patent is extended or adjusted under 35 U.S.C. 154(b) by 23 days.

(21) Appl. No.: 14/710,301

(22) Filed: May 12, 2015

(65) Prior Publication Data

US 2016/0334085 A1 Nov. 17, 2016

(51) Int. Cl.

| | |
|---|---|
| ***F21V 21/00*** | (2006.01) |
| ***F16M 11/24*** | (2006.01) |
| ***F21V 19/04*** | (2006.01) |
| *F21S 8/02* | (2006.01) |
| *F21Y 105/16* | (2016.01) |
| *F21K 9/23* | (2016.01) |
| *F21Y 115/10* | (2016.01) |

(52) U.S. Cl.

CPC ................ *F21V 19/04* (2013.01); *F21K 9/23* (2016.08); *F21S 8/026* (2013.01); *F21Y 2105/16* (2016.08); *F21Y 2115/10* (2016.08)

(58) Field of Classification Search

CPC ..... F16M 11/24; F21V 21/06; F21V 21/0824; F21V 21/22; F21V 19/0095; F21V 19/009

See application file for complete search history.

(56) References Cited

U.S. PATENT DOCUMENTS

| | | | | | |
|---|---|---|---|---|---|
| 446,325 | A * | 2/1891 | Cash | E01F 13/06 | 49/124 |
| 1,508,206 | A * | 9/1924 | Waters | F21V 21/0824 | 248/156 |
| 1,998,296 | A * | 4/1935 | Walker | H01R 4/4845 | 174/138 H |
| 2,112,995 | A * | 4/1938 | O'Keefe | F21V 19/009 | 174/138 H |
| 2,335,296 | A * | 11/1943 | Miller | G09F 13/26 | 248/50 |
| 2,357,057 | A * | 8/1944 | Owen | F21S 8/04 | 362/147 |
| 2,767,946 | A * | 10/1956 | Weeks | F21V 19/009 | 24/551 |
| 3,712,981 | A * | 1/1973 | Eargle, Jr. | F21S 8/02 | 362/216 |
| 4,035,955 | A * | 7/1977 | Burnett | E01F 13/06 | 49/280 |
| 7,195,038 | B2 * | 3/2007 | Friedline | F16L 3/085 | 138/106 |
| 7,461,963 | B2 * | 12/2008 | Ono | G02F 1/133604 | 362/216 |
| 7,826,008 | B2 * | 11/2010 | Baba | G02F 1/133604 | 349/58 |
| 8,289,474 | B2 * | 10/2012 | Koh | G02F 1/133604 | 349/61 |

* cited by examiner

*Primary Examiner* — Ismael Negron

(74) *Attorney, Agent, or Firm* — Clark Hill PLC; James R. Foley

(57) ABSTRACT

Support structure includes at least one adjustable length pin configured to engage an adjacent support surface, and at least one engaging member configured to engage a supported device. A support bar might be provided with the at least one pin extending from one side of the bar, and the at least one engaging member extending from another side of the support bar.

17 Claims, 8 Drawing Sheets

SUPPORT STRUCTURE FOR HORIZONTALLY EXTENDING LAMP

BACKGROUND

The present invention generally relates to support structures and methods for maintaining a lamp in horizontal alignment with a socket, after the lamp has been installed.

Some lamps, such as LED light fixtures for use in commercial applications, are quite long and heavy. As such, once they are engaged horizontally in a corresponding socket, they impart a moment on the socket. This moment stresses the socket, and eventually the end of the lamp may droop downward. In other words, given enough time, the lamp may not point horizontally from the socket, but may instead droop downward.

Some lamps are mounted horizontally in a socket in a ceiling, and shine their light downward. Oftentimes, if the lamp is sufficiently long and heavy, the weight of the lamp will cause the lamp to stress the socket, causing the end of the lamp to droop downward. Sometimes lamps such as these are mounted behind a cover or lens. In that case, the weight of the lamp may droop downward until the end of the lamp contacts the cover or lens.

Other lamps are mounted horizontally in a socket which is disposed in a recess in a wall, and shine their light horizontally. If the lamp is sufficiently long and heavy, the weight of the lamp may cause the lamp to stress the socket, causing the end of the lamp to droop downward (and possibly even come to into contact with a wall which defines the recess).

All of this is neither ideal in terms of overall appearance, nor with regard to the angle at which the light shines from the lamp.

SUMMARY

An object of an embodiment of the present invention is to provide a support structure that functions to keep a lamp horizontally aligned with its corresponding socket, after the lamp is installed in the socket.

Another object of an embodiment of the present invention is to provide a method for installing a lamp horizontally in a socket such that horizontal alignment of the lamp relative to the socket is maintained.

Briefly, a specific, preferred embodiment of the present invention provides a support structure, such as a support pin assembly, which is configured to engage both a lamp and adjacent structure, after the lamp has been installed horizontally in a socket. The support structure, by contacting the adjacent structure, maintains the lamp in horizontal alignment with regard to the socket, and also decreases the amount of stress that would otherwise be applied to the socket by the lamp.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which.

DESCRIPTION OF ILLUSTRATED EMBODIMENTS

Figure 1:
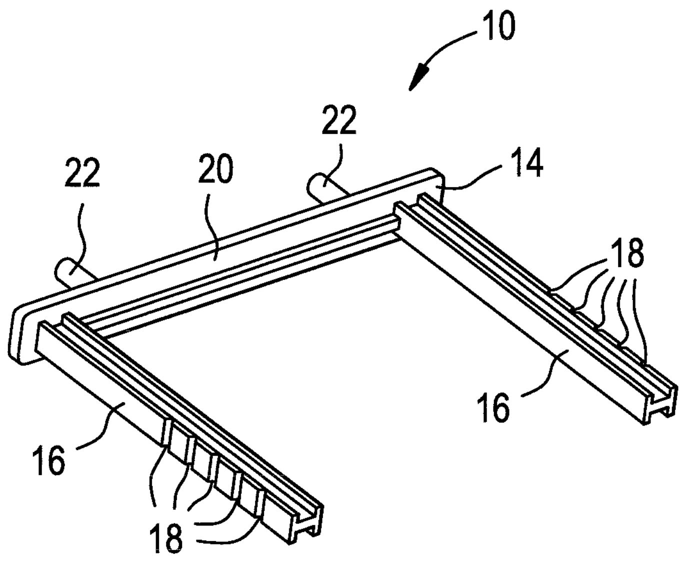
FIG. 1 is a perspective view of a support structure that is in accordance with a first embodiment of the present invention.

While this invention may be susceptible to embodiment in different forms, there are shown in the drawings and will be described herein in detail, specific embodiments with the understanding that the present disclosure is to be considered an exemplification of the principles of the invention, and is not intended to limit the invention to that as illustrated.

Figure 5:
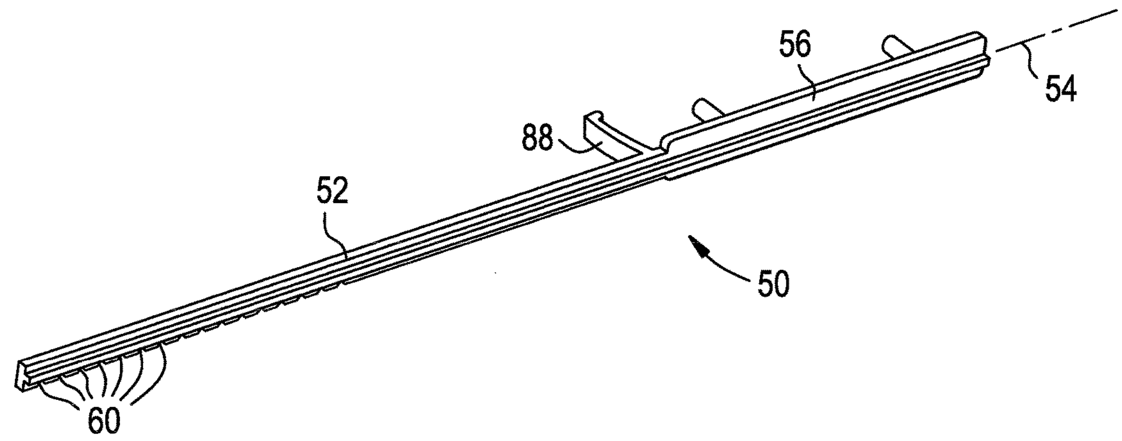
FIG. 5 is a perspective view of a support structure that is in accordance with a second embodiment of the present invention.

FIG. 1 is a perspective view of a support structure 10 which is in accordance with a first embodiment of the present invention, while FIG. 5 is a perspective view of a support structure 50 which is in accordance with a second embodiment of the present invention. Both embodiments provide a support structure which functions to keep a lamp horizontally aligned with its corresponding socket, after the lamp has been installed in the socket. Specifically, the support structure 10 shown in FIG. 1 is configured to be employed when the lamp is installed in a socket such that the lamp shines light in a downward direction, while the support structure 50 shown in FIG. 5 is configured to be used when the lamp is installed in a socket such that the lamp shines light in a horizontal direction.

Figure 2:
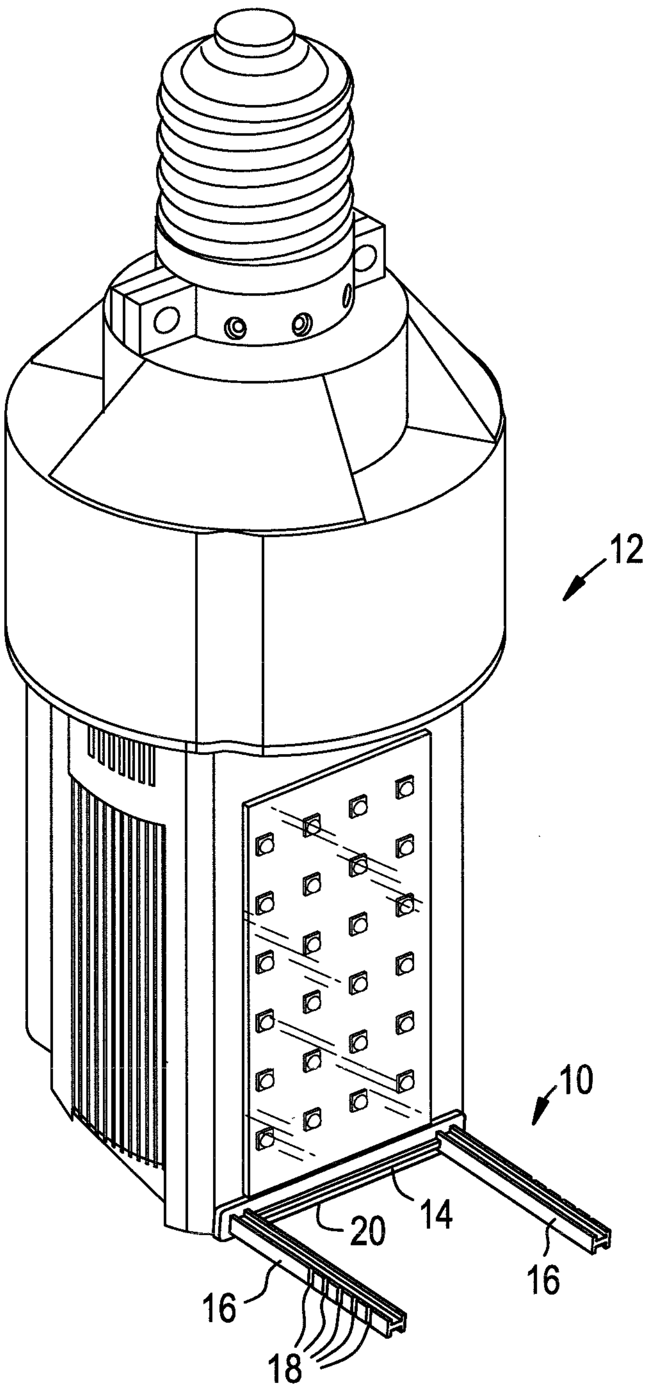
FIG. 2 illustrates the support structure of FIG. 1 engaged with an exemplary lamp.
Figure 3:
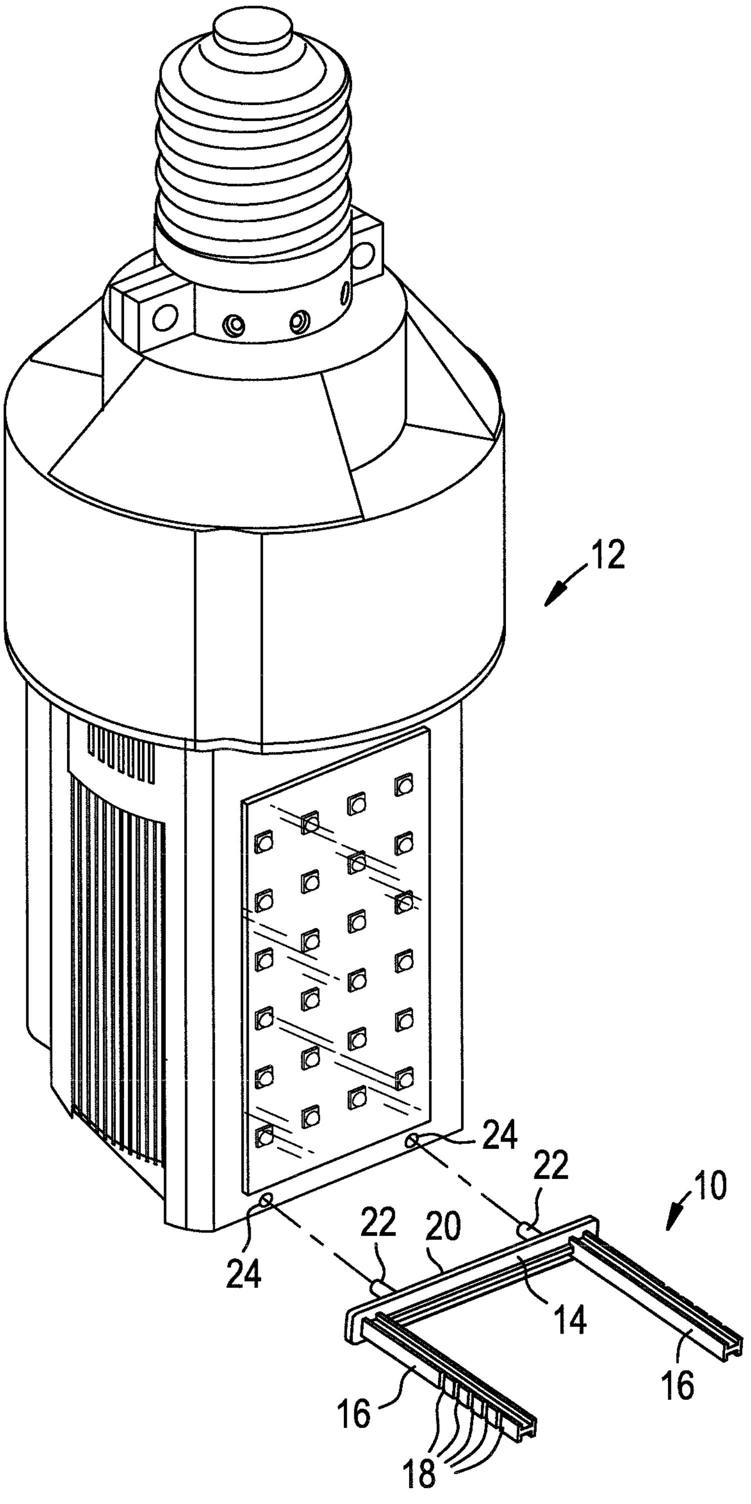
FIG. 3 is similar to FIG. 2, but shows the support structure spaced away from the lamp to expose sockets with which the support structure engages.
Figure 4:
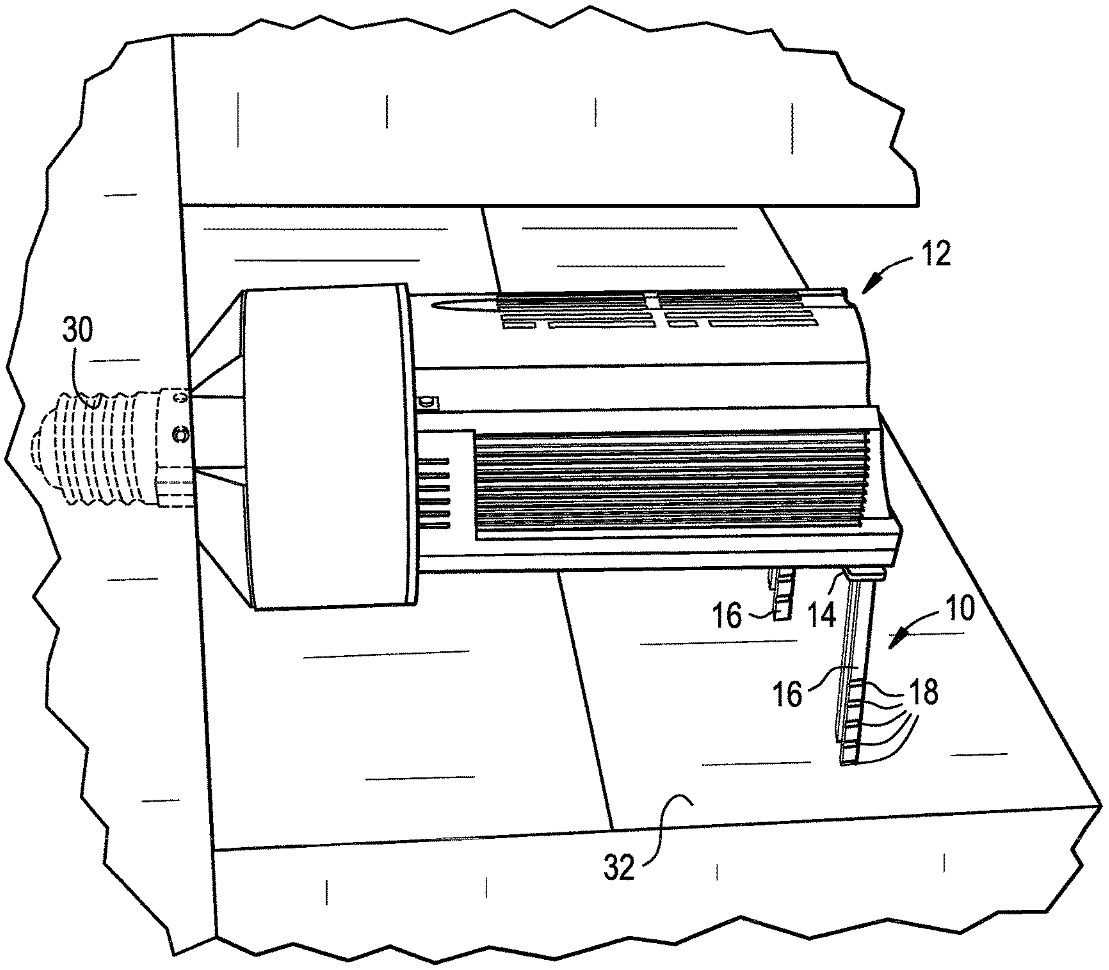
FIG. 4 shows the lamp of FIG. 3 installed.

The support structure 10 illustrated in FIG. 1 will now be described. The support structure shown in FIG. 1 is configured to engage a lamp 12, such as the lamp 12 as shown in FIGS. 2-4. While a specific lamp 12 is shown in FIGS. 2-4, the support structure can be engaged with lamps that are very different from the lamp shown in FIGS. 2-4.

As shown in FIG. 1, the support structure 10 preferably comprises a support pin assembly 14 which includes one or more extending, adjustable-length pins 16. Each adjustable-length pin 16 is preferably configured such that its length is easily customizable. To this end, each pin 16 preferably comprises a plurality of pre-defined break or trim points 18, such as decreased diameter portions or notches, which are configured such that the pin 16 can be easily trimmed or broken off at any of the points 18. As such, a user can break the pins off, or trim them, at any length he or she chooses, depending on the application.

As shown in FIG. 1, the adjustable-length pins 16 preferably extend from a support bar 20, on one side of the support bar, generally at a right angle relative thereto, while one or more lamp-engaging members 22 extend from the other side of the support bar 20. As shown in FIGS. 2 and 3, the lamp-engaging members 22 are preferably configured to engage the lamp 12, such as by engaging in corresponding sockets 24 (see FIG. 3) that are provided in the lamp 12. Specifically, the lamp-engaging members 22 may be configured to be pins which snap into corresponding sockets 24 in the lamp 12.

FIG. 2 illustrates the support structure 10 of FIG. 1 engaged with the exemplary lamp 12. FIG. 3 is similar to FIG. 2, but shows the support structure 10 spaced away from the lamp 12 to expose sockets 24 with which the support structure 10 engages. FIG. 4 shows the lamp of FIG. 3 installed.

As shown in FIG. 4, either before or after the lamp 12 is installed in an electrical socket 30, and either before or after the support structure 10 is engaged with the lamp 12, the adjustable-length pins 16 of the support structure 10 are customized (such as by being trimmed or broken off at a given break point 18 to a desired length). Once the lamp 12 has been installed and the adjustable-length pins 16 have been trimmed or broken off to size, a ceiling lens or cover 32 is installed in the ceiling such that the pins 16 of the support structure 10 contact the lens or cover 32. Alternatively, after installation, the pins 16 can be spaced slightly away from the lens or cover 32, in which case should the lamp 12 begin to droop after installation, the pins 16 would then contact the lens or cover 32 and limit further drooping of the lamp 12. Regardless, contact of the pins 16 with the lens or cover 32 functions to keep the lamp 12 horizontally aligned with regard to the electrical socket 30 in which the lamp 12 is installed. This also functions to reduce the stress on the socket 30.

The support structure 50 shown in FIG. 5 is quite similar to the support structure 10 shown in FIG. 1 in the way that it functions, but is instead configured to be employed when a lamp is installed such that it shines light in a horizontal direction, such as when a lamp is installed in a recess in a wall. As shown in FIG. 5, the support structure 50, instead of comprising one or more adjustable-length pins which extend from one side of a support bar, generally at a right angle relative thereto, preferably comprises a single adjustable-length pin 52 which may extend generally parallel to, and generally in linear alignment with, a longitudinal axis 54 of the support bar 56. Much like the adjustable-length pins 16 described previously, the adjustable-length pin 52 is preferably configured such that its length is easily customizable. To this end, the pin 52 preferably comprises a plurality of pre-defined break or trim points 60, such as decreased diameter portions or notches, which are configured such that the pin 52 can be easily trimmed or broken off at any of the points 60. As such, a user can break the pin 52 off, or trim the pin 52, at any length he or she chooses, depending on the application.

Much like the support structure 10 previously described, the support structure 50 preferably includes one or more lamp-engaging members 58 which are configured to engage the lamp 12, such as by engaging in corresponding sockets 24 (see FIG. 7) that are provided in the lamp 12. Specifically, the lamp-engaging members 22 may be configured to be pins which snap into corresponding sockets 24 in the lamp 12.

Figure 6:
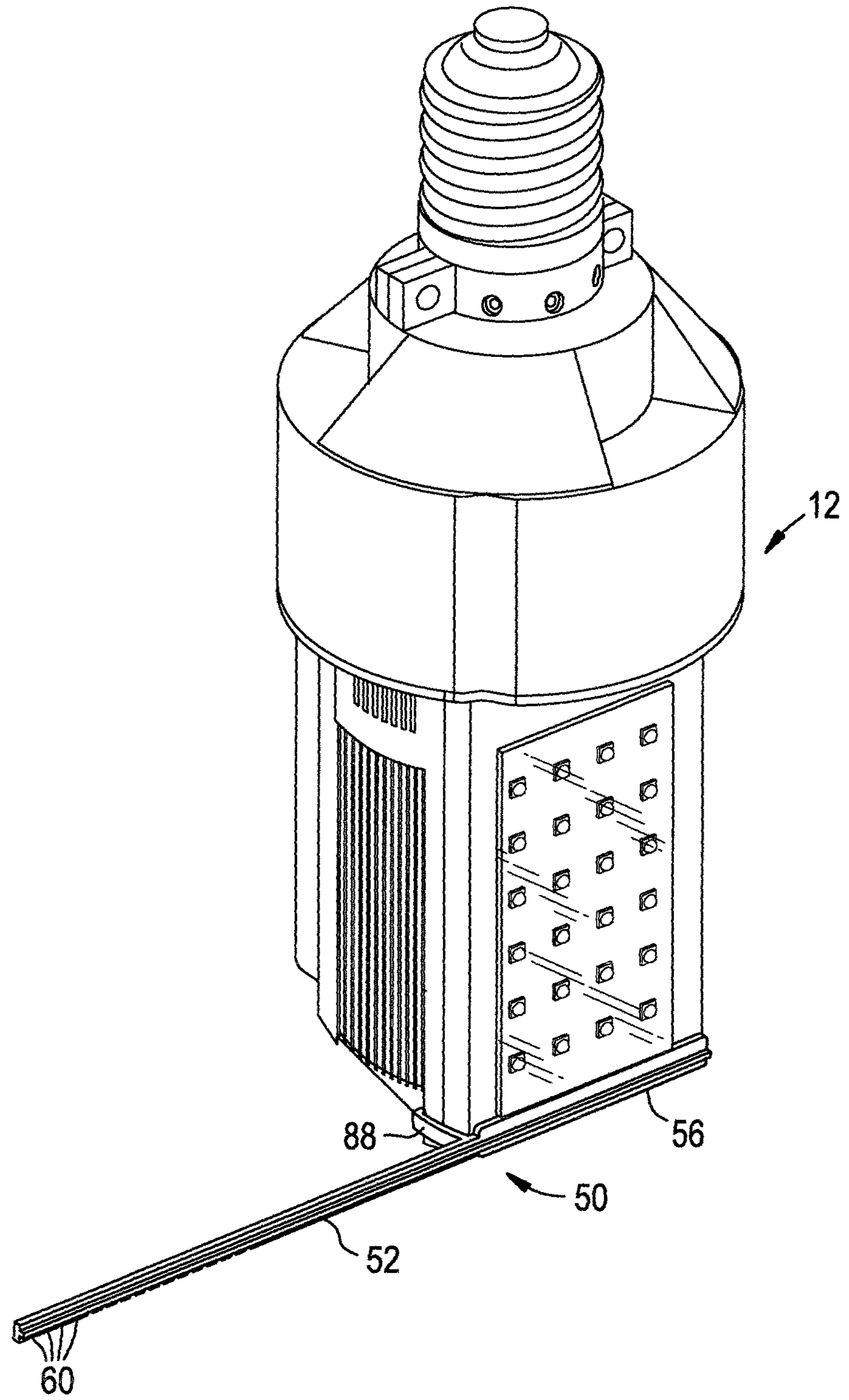
FIG. 6 illustrates the support structure of FIG. 5 engaged with an exemplary lamp.
Figure 7:
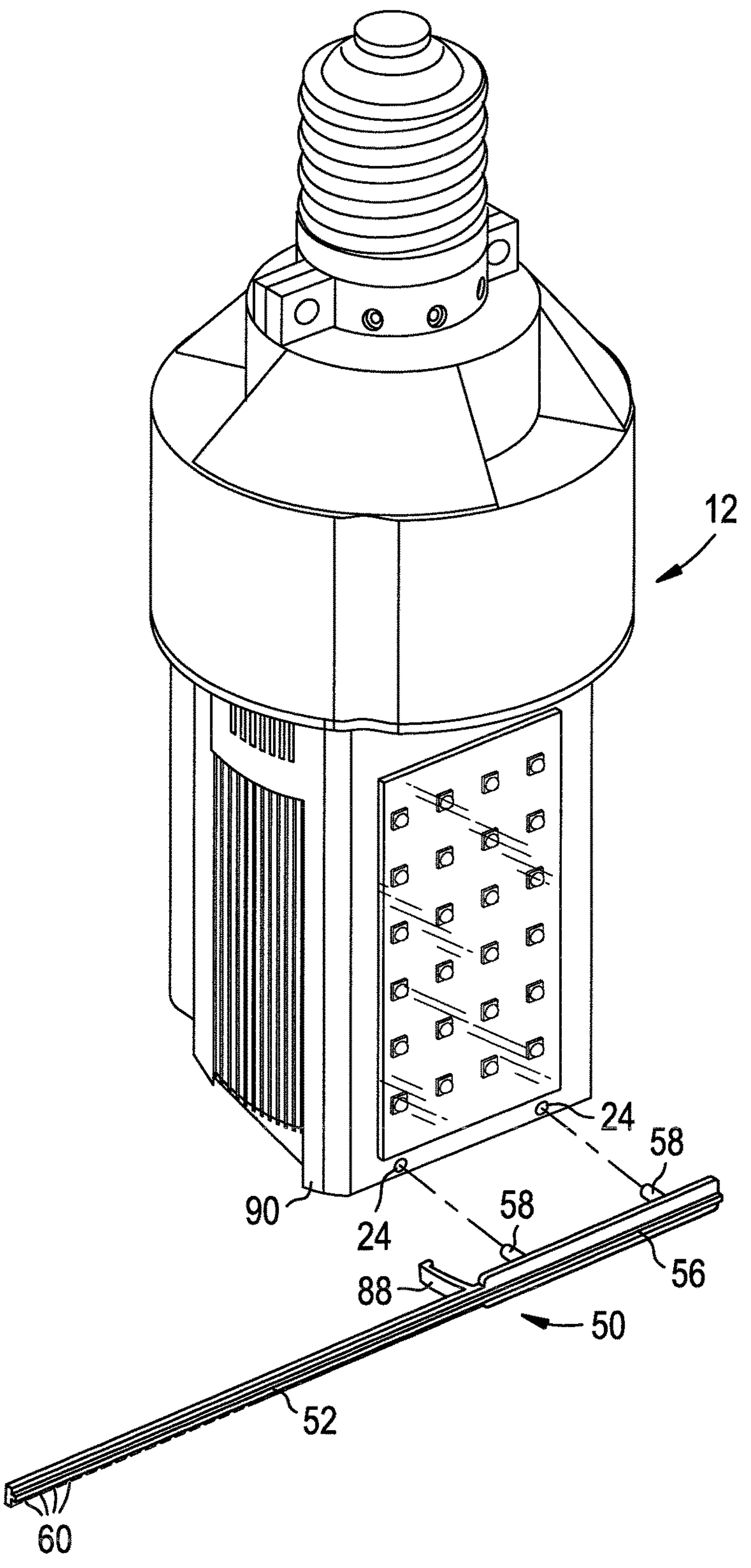
FIG. 7 is similar to FIG. 6, but shows the support structure spaced away from the lamp to expose sockets with which the support structure engages.
Figure 8:
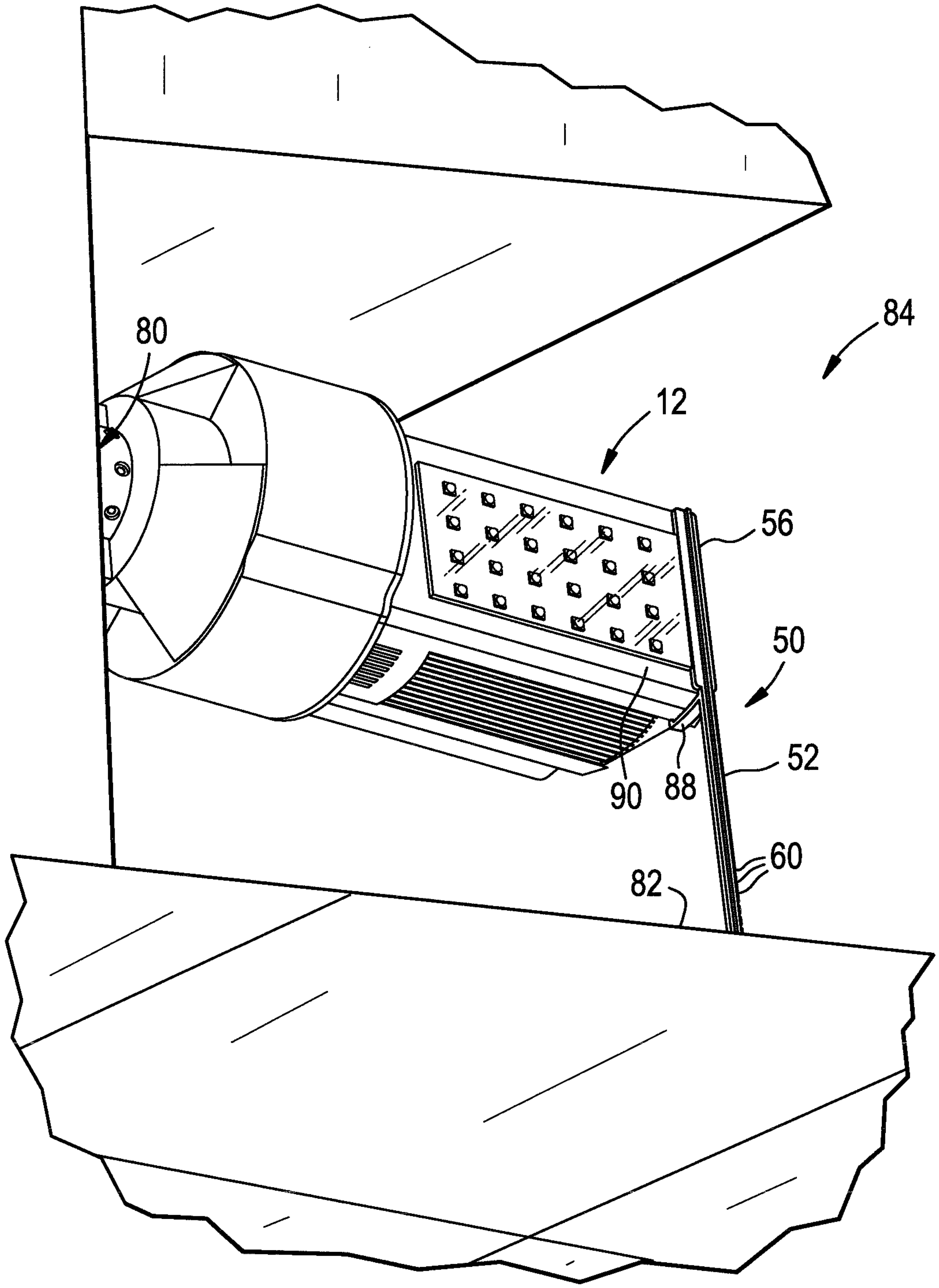
FIG. 8 shows the lamp of FIG. 7 installed.

FIG. 6 illustrates the support structure 50 of FIG. 5 engaged with the exemplary lamp 12. FIG. 7 is similar to FIG. 6, but shows the support structure 50 spaced away from the lamp 12 to expose the sockets 24 with which the support structure 50 engages. FIG. 8 shows the lamp 12 of FIG. 7 installed.

As shown in FIG. 8, either before or after the lamp 12 is installed in an electrical socket 80, and either before or after the support structure 50 is engaged with the lamp 12, the adjustable-length pin 52 of the support structure is customized (such as by being trimmed or broken off at a given break point 60 to a desired length). Once installed, the pin 52 preferably contacts an adjacent surface 82, such as a wall in the recess 84 in which the lamp 12 is installed. Alternatively, the pin 52 can be spaced slightly away from the surface 82, in which case should the lamp 12 begin to droop after installation, the pin 52 would then contact the surface 82 and limit further drooping of the lamp 12. Regardless, contact of the pin 52 with the surface 82 functions to keep the lamp 12 horizontally aligned with its corresponding electrical socket 80, after the lamp 12 has been installed. This also functions to reduce the stress on the socket 80. As shown in FIGS. 5-8, the support structure may also include a support arm 88 which engages a side 90 of the lamp 12 and provides support.

Both support structures 10 and 50 can be provided as being a single plastic piece, but still other variations are quite possible. Regardless, each is preferably configured to engage a lamp, and engage an adjacent surface (such as a ceiling lens or cover, or a surface in the recess of a wall), such that the lamp tends to maintain horizontal alignment with regard to the electrical socket in which the lamp is installed.

With either embodiment, a lamp is installed in an electrical socket, the adjustable length pin(s) of the support structure are adjusted (i.e., trimmed or broken off) to their desired length, and the support structure is engaged with the lamp. If the lamp was installed in a ceiling, a lens or cover is then installed. However, if the lamp was installed in a wall, this final step can be skipped.

While specific embodiments of the invention have been shown and described, it is envisioned that those skilled in the art may devise various modifications without departing from the spirit and scope of the present invention.

What is claimed is:

1. A method of maintaining a lamp in horizontal alignment with regard to a socket in which the lamp is engaged, said method comprising the steps of:

providing a single piece support structure comprising at least one adjustable-length pin;

at least one of breaking and trimming the at least one adjustable-length pin of the support structure;

engaging the support structure with the lamp; and contacting the at least one adjustable-length pin with an adjacent support surface such that the at least one adjustable-length pin contacts the adjacent support surface and maintains the lamp in horizontal alignment with regard to the socket.

2. The method as recited in claim 1, the single piece support structure further comprising at least one lamp-engaging member including a plurality of members configured to engage a corresponding structure on the lamp, and engaging the plurality of members with the corresponding structure on the lamp.

3. The method as recited in claim 1, the single piece support structure further comprising at least one lamp-engaging member including a plurality of members configured to engage corresponding sockets on the lamp, and engaging the plurality of members with the corresponding sockets on the lamp.

4. The method as recited in claim 1, the single piece support structure further comprises a single piece made of a plastic material.

5. The method as recited in claim 1, the at least one adjustable-length pin further comprises a plurality of points, and the step of at least one of breaking and trimming the at least one adjustable-length pin to a pre-determined length is performed at one of said points.

6. The method as recited in claim 1, the at least one adjustable-length pin further comprises a plurality of notches which are configured to provide break points along the pin, and the step of at least one of breaking and trimming the at least one adjustable-length pin to a pre-determined length includes breaking the at least one adjustable-length pin to a pre-determined length at one of said notches.

7. The method as recited in claim 1, the at least one adjustable-length pin further comprises a plurality of pins, wherein each pin comprises a plurality of points which are configured such that the pin can be at least one of broken and trimmed to a pre-determined length, and the step of at least one of breaking and trimming each of the plurality of pins to a pre-determined length is performed at one of said points.

8. The method as recited in claim 1, the at least one adjustable-length pin further comprises a plurality of pins, wherein each pin comprises a plurality of notches which are configured to provide break points along the pin, and the step of at least one of breaking and trimming each of the plurality of pins to a pre-determined length is performed at one of said notches.

9. The method as recited in claim 1, the at least one adjustable-length pin comprises a single pin, wherein the single pin comprises a plurality of points which are configured such that the single pin can be at least one of broken and trimmed to a pre-determined length, and the step of at least one of breaking and trimming said single pin to a pre-determined length is performed at one of said points.

10. The method as recited in claim 1, the at least one adjustable-length pin comprises a single pin, wherein the single pin comprises a plurality of notches which are configured such that the single pin can be at least one of broken and trimmed to a pre-determined length, and the step of at least one of breaking and trimming said single pin to a pre-determined length is performed at one of said notches.

11. The method as recited in claim 1, the support structure further comprises a support bar having a first side and a second opposite side, wherein the at least one adjustable-length pin extends from the first side of the support bar, and the at least one lamp-engaging member extends from the second opposite side of the support bar.

12. The method as recited in claim 1, the support structure further comprises a support bar having a first side and a second opposite side, wherein the at least one adjustable-length pin comprises a plurality of pins which extend from the first side of the support bar, and the at least one lamp-engaging member comprises a plurality of members which extend from the second opposite side of the support bar.

13. The method as recited in claim 1, the support structure further comprises a support bar having a first side and a second side, wherein the at least one adjustable-length pin comprises a plurality of pins which extend from the first side of the support bar, and the at least one lamp-engaging member comprises a plurality of members which extend from the second side of the support bar, wherein each of the pins comprises a plurality of points which are configured such that the pin can be at least one of broken and trimmed to a pre-determined length, and the step of at least one of breaking and trimming each of the plurality of pins to a pre-determined length is performed at one of said points.

14. The method as recited in claim 1, the support structure further comprises a support bar having a first side and a second side, wherein the at least one adjustable-length pin comprises a plurality of pins which extend from the first side of the support bar, and the at least one lamp-engaging member comprises a plurality of members which extend from the second side of the support bar, wherein each of the pins comprises a plurality of notches which are configured to provide break points along the pin, and the step of at least one of breaking and trimming each of the plurality of pins to a pre-determined length is performed at one of said notches.

15. The method as recited in claim 1, the support structure further comprises a support bar having a longitudinal axis and a side, wherein the at least one adjustable-length pin comprises a single pin which extends parallel to, and in linear alignment with, the longitudinal axis of the support bar, and the at least one lamp-engaging member comprises a plurality of members which extend from the side of the support bar.

16. The method as recited in claim 1, the support structure further comprises a support bar having a longitudinal axis and a side, wherein the at least one adjustable-length pin comprises a single pin which extends parallel to, and in linear alignment with, the longitudinal axis of the support bar, and the at least one lamp-engaging member comprises a plurality of members which extend from the side of the support bar, wherein the single pin comprises a plurality of points which are configured such that the pin can be at least one of broken and trimmed to a pre-determined length, and the step of at least one of breaking and trimming each of the plurality of pins to a pre-determined length is performed at one of said points.

17. The method as recited in claim 1, the support structure further comprises a support bar having a longitudinal axis and a side, wherein the at least one adjustable-length pin comprises a single pin which extends parallel to, and in linear alignment with, the longitudinal axis of the support bar, and the at least one lamp-engaging member comprises a plurality of members which extend from the side of the support bar, wherein the single pin comprises a plurality of notches which are configured to provide break points along the single pin, and the step of at least one of breaking and trimming the at least one adjustable-length pin to a pre-determined length includes breaking the single pin to a predetermined length at one of said notches.

* * * * *